(12) United States Patent
Broz et al.

(10) Patent No.: US 10,652,708 B1
(45) Date of Patent: May 12, 2020

(54) SYSTEM AND METHOD FOR REPORTING OBSERVED EVENTS/OBJECTS FROM SMART VEHICLES

(71) Applicant: INTERNATIONAL BUSINESS MACHINES CORPORATION, Armonk, NY (US)

(72) Inventors: Michal Broz, Cedar Park, TX (US); Steven D. Clay, Round Rock, TX (US); Shunguo Yan, Austin, TX (US); Paul W. Bennett, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/163,089

(22) Filed: Oct. 17, 2018

(51) Int. Cl.
G08C 19/22 (2006.01)
*H04W 4/38* (2018.01)
*H04W 4/44* (2018.01)
*H04Q 9/00* (2006.01)
G05D 1/00 (2006.01)

(52) U.S. Cl.
CPC ............... *H04W 4/38* (2018.02); *H04Q 9/00* (2013.01); *H04W 4/44* (2018.02); G05D *1/0088* (2013.01)

(58) Field of Classification Search
None
See application file for complete search history.

(56) References Cited

U.S. PATENT DOCUMENTS

| 8,195,394 | B1 | 6/2012 | Zhu et al. | |
|---|---|---|---|---|
| 9,384,666 | B1 | 7/2016 | Harvey | |
| 9,547,989 | B2 | 1/2017 | Fairfield et al. | |
| 10,234,859 | B2 * | 3/2019 | Lokesh | B60W 30/16 |
| 2004/0267419 | A1 | 12/2004 | Jeng | |
| 2015/0344038 | A1 * | 12/2015 | Stenneth | B60W 40/103 340/439 |

(Continued)

FOREIGN PATENT DOCUMENTS

WO 2017158155 A1 9/2017

OTHER PUBLICATIONS

Singh et al., "Use of LIDAR in Transportation", http://www.ijirst.org/articles/IJIRSTV316034.pdf, IJIRST—International Journal for Innovative Research in Science & Technology, vol. 3, Issue 6, Nov. 2016, 3 pages.

(Continued)

*Primary Examiner* — Adolf Dsouza
(74) *Attorney, Agent, or Firm* — Jay Wahlquist; Andrew D. Wright; Roberts Calderon Safran & Cole P.C.

(57) ABSTRACT

An event/object reporting system is provided using data from sensors of a smart vehicle, which events/objects are observed by the smart vehicle but do not involve the smart vehicle. For this purpose, a computer-implemented method includes collecting, by the computer device, sensor data from at least one sensor on the smart vehicle regarding events/objects external to the smart vehicle, analyzing, by the computer device, the sensor data to detect whether a predetermined event and/or object external to the smart vehicle is found in the sensor data, and transmitting, by the computer device, portions of the sensor data pertaining to the predetermined event and/or object to an external server based on the detecting.

20 Claims, 5 Drawing Sheets

(56) References Cited

U.S. PATENT DOCUMENTS

2017/0025007 A1    1/2017  Hyde et al.

OTHER PUBLICATIONS

Mell et al., "The NIST Definition of Cloud Computing", NIST, Special Publication 800-145, Sep. 2011, 7 pages.
Ki, "Accident Detection System using Image Processing and MDR",<http://paper.ijcsns.org/07_book/200703/20070306.pdf> IJCSNS International Journal of Computer Science and Network Security, vol. 7 No. 3, Mar. 2007, pp. 35-39.
Komando, "Your car's hidden 'black box' and how to keep it private", <https://www.usatoday.com/story/tech/columnist/komando/2014/12/26/keep-your-car-black-box-private/20609035/>, USA Today, Dec. 26, 2014, 3 pages.
Lee, "An Accident Detection System on Highway through CCTV with Calogero-Moser System", IEEE, 2012, 4 pages.
Akoz et al., "Video-Based Traffic Accident Analysis at Intersections Using Partial Vehicle Trajectories", Proceedings of 2010 IEEE 17th International Conference on Image Processing, Sep. 26-29, 2010, Hong Kong, 4 pages.
Tsuge et al., "Accident Vehicle Automatic Detection System by Image Processing Technology", 1994 Vehicle Navigation & Information Systems Conference Proceedings IEEE, 1994, 6 pages.
Harlow et al., "Automated Accident Detection System", The National Academies of Sciences Engineering Medicine https://trrjournalonline.trb.org/doi/abs/10.3141/1746-12?journalCode=trr, Accessed Dec. 13, 2018, 1 page Abstract.

\* cited by examiner

SYSTEM AND METHOD FOR REPORTING OBSERVED EVENTS/OBJECTS FROM SMART VEHICLES

BACKGROUND

The present invention generally relates to an event/object reporting system, and, more particularly, to an event/object reporting system using data from sensors of a smart vehicle, which events/objects are observed by the smart vehicle but do not involve the smart vehicle.

Smart vehicles augment the driving experience through the use of built-in sensors. One example of smart vehicles is autonomous/self-driving vehicles. Recently, smart vehicle technology, including self-driving vehicles, has been developing rapidly. Typically, such smart vehicles include multiple sensors, including, but not limited to, LiDAR, ultrasonic sensors, video cameras, infrared detectors, etc., mounted on the front, back and both sides of the vehicle. Smart vehicles also include internal sensors for detecting direction, time, location, weather conditions, etc.

SUMMARY

In a first aspect of the invention, there is a computer-implemented method comprising: collecting, by the computer device, sensor data from at least one sensor on the smart vehicle regarding events/objects external to the smart vehicle; analyzing, by the computer device, the sensor data to detect whether a predetermined event and/or object external to the smart vehicle is found in the sensor data; and transmitting, by the computer device, portions of the sensor data pertaining to the predetermined event and/or object to an external server based on the detecting.

In another aspect of the invention, there is a computer program product including a computer readable storage medium having program instructions embodied therewith, the program instructions executable by a computing device external to a smart vehicle to cause the computing device to: transmit an instruction to the smart vehicle to look for an event and/or object pertaining to vehicles or objects other than the smart vehicle; receive, from the smart vehicle, sensor data obtained by at least one sensor on the smart vehicle in response to the instructions to look for the event and/or object; and analyze the sensor data received from the smart vehicle to detect whether the event and/or object is found in the sensor data.

In another aspect of the invention, there is system including: a processor; a computer readable memory; a computer readable storage medium in a smart vehicle; program instructions to receive, in the smart vehicle, instructions from an external server to look for an event and/or object external to the smart vehicle; program instructions to collect sensor data from at least one sensor on the smart vehicle; program instructions to analyze the sensor data to determine if the event and/or object is found in the sensor data; and program instructions to provide portions of the sensor data pertaining to the event and/or object to the external server based on the detecting. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
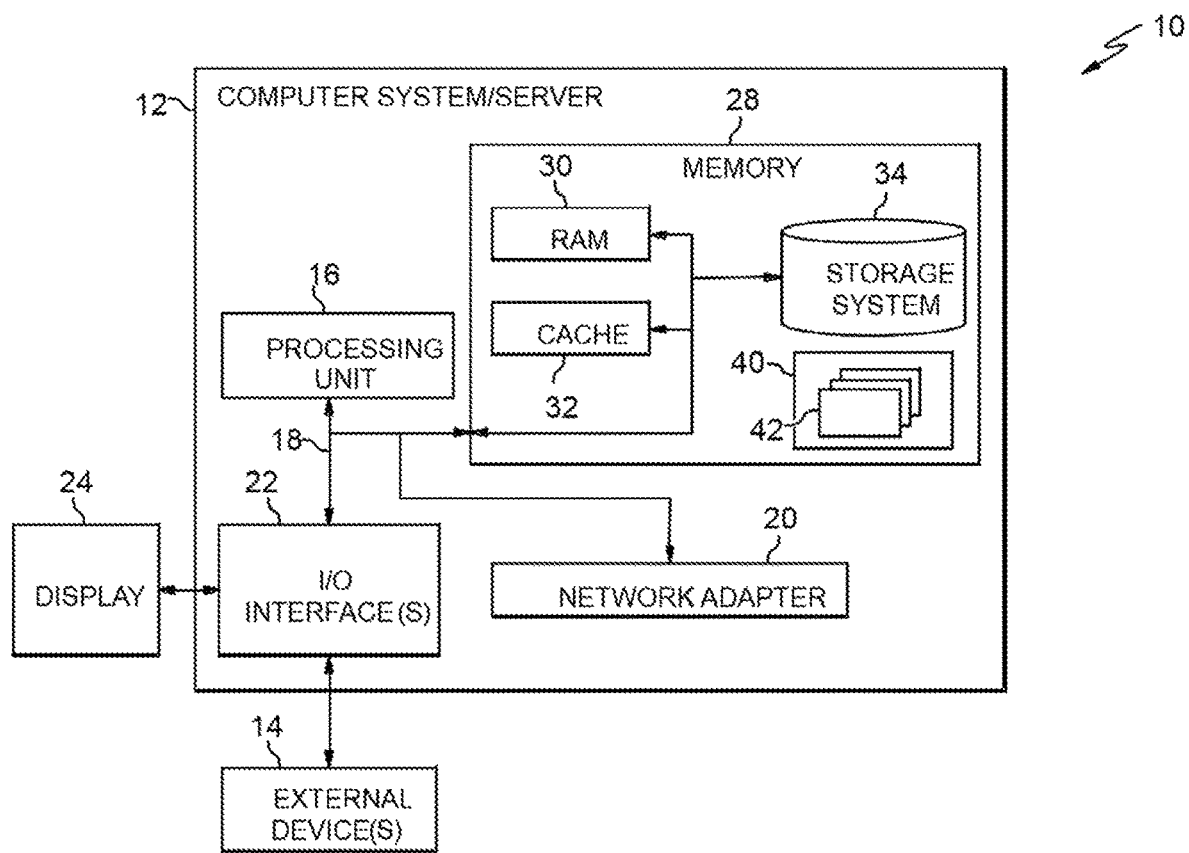
FIG. 1 depicts a cloud computing node according to an embodiment of the present invention.

The present invention generally relates to an event/object reporting system, and, more particularly, to an event/object reporting system using data from sensors of a smart vehicle, which events and/or objects are observed by the smart vehicle but do not involve the smart vehicle. Aspects of the present invention are directed to leveraging sensor information from smart vehicles to provide information regarding events, such as traffic accidents, which involve other vehicles, such as non-smart vehicles, and which occur in the vicinity of one or more smart vehicles. Currently, when an event, or incident, such as an accident occurs involving a smart vehicle, information from the various smart vehicle sensors is used to help re-create the accident to aid in determining the cause. For example, a company/owner of the smart vehicle is able to leverage the various sensor information to re-create the cause of the accident. The smart vehicle sensor information can be analyzed in the vehicle itself, or sent to an external server, such as public safety authorities, insurance companies, hospitals, fire departments and/or manufacturers. However, when two non-smart vehicles get in an accident, or an accident occurs involving only one non-smart vehicle (such as hitting an inanimate object, for example, a lamppost), no sensor information from the non-smart vehicle is available. Therefore, in accordance with aspects of the present invention, sensor data from passing smart vehicles is used to help re-create the accident, or other events involving non-smart vehicles in the vicinity of the smart vehicle.

Aspects of the present invention further include using smart vehicle sensors to look for objects of interest in the vicinity of such smart vehicles, and to dynamically process data regarding such objects. For example, such objects of interest include license plates and vehicle descriptions of other vehicles which have been involved in public alerts (i.e., Amber Alerts and Silver Alerts) and other vehicle-related incidents. In other aspects of the present invention, the sensor data from smart vehicles is used to provide information to public safety officers on matters of public safety concern, such as fires, tornadoes, flooding and other types of natural disasters. In alternative embodiments, sensor data from smart vehicles is used for facial recognition to search for people, either in other vehicles or outside, in accordance with applicable laws regarding individual privacy.

In accordance with aspects of the present invention, a smart vehicle is provided with instructions, from an external server, to look for events (for example, accidents) and/or objects (including, but not limited to, license plates and car makes/models, colors etc.). Continuously, or periodically, the smart vehicle collects its sensor data (including, but not limited to, LiDAR, ultrasonic sensors, video cameras, infrared sensors, radar, gyros, GPS, weather equipment, etc.), which includes metadata including, but not limited to, location, weather information and time. Regarding this data collection, many smart vehicles have a preset cadence, depending on the manufacturer, for the periodic collection of sensor data. Using cognitive processing techniques, such as computer vision, the smart vehicle analyzes the sensor data to determine if the events and/or objects, which the smart vehicle has been instructed to look for by the external server, are present in the sensor data. If a matching event/object is found, the smart vehicle flags the data and provides a data upload to the external server. In embodiments, the data upload is limited to a portion of the sensor data which relates to the particular event/object for which the external server provided instructions. In alternative embodiments, all of the sensor data within a predetermined time period bracketing the time that the particular event/object was detected is provided to the external server. Typically, the smart vehicle is wirelessly connected to the external server via the cloud, although other connection arrangements are possible.

Aspects of the invention further include the external server searching the uploaded data from the smart vehicles by searching for the location and time where an event of interest, such as an accident, is known to have occurred in order to better re-create the scene of the accident. In other embodiments, the smart vehicle notifies the external server that an accident has occurred at a certain location and time, based on the metadata of the sensor data, and provides the external server with the appropriate data pertaining to the event (or detection of a searched-for object). In alternative embodiments, the sensor data for a predetermined period of time, starting before the event/object is detected and ending after the events/object is determined to be completed, is provided to the external server.

In alternative embodiments, rather than providing analysis of the sensor data in the smart vehicle itself, the smart vehicle transmits all of its sensor data over a predetermined time to the external server, and the analysis of the sensor data to determine if the search for events/object is present in the sensor data is performed at the external server itself. Inasmuch as smart vehicles are typically connected to an external server utilizing the cloud, performing the sensor data analysis provides an efficient option for analysis.

As discussed above, aspects of the present invention provide for leveraging sensor data from smart vehicle sensors to collect data about non-smart vehicles or other objects in the vicinity of a smart vehicle, particularly providing information about vehicles and/or objects other than the smart vehicle providing the sensor data. The appropriate sensor data is then provided to appropriate third party entities, which can include public safety officials, the fire department, hospitals, insurance companies and/or the smart vehicle manufacturer. Therefore, in addition to permitting reconstruction of accidents, the sensor data in the smart vehicle can be used for numerous other purposes, such as finding lost or abducted persons (e.g., Amber Alerts, Silver Alerts), or reports on natural or man-made disasters such as fires, tornadoes, floods, etc.

As noted above, embodiments of the invention include utilizing cloud processing so that analysis of the sensor data from the smart vehicle is performed by an external server. Alternatively, the analysis can be performed in the smart vehicle itself, either via a built-in analysis unit provided by the manufacturer, or by a separate analysis unit installed after vehicle purchase. Yet another alternative is to perform analysis in an inter-smart vehicle network in which smart vehicles are connected together from the same region, group or a company for networking purpose. In the event that the sensor data analysis is performed in the smart vehicle itself, in embodiments the driver is provided with the option of transmitting either a real-time report to the external server, or a delayed report, after the data has been displayed for the driver to review, or no report if the driver wishes to not provide data to the external server. In alternative embodiments where the analysis is performed in the external server, confidentiality of the information provided by the smart vehicle sensors is provided by preventing the driver from knowing which objects are being looked for. In an alternative embodiment where the analysis is performed in the inter-vehicle network, the data pooled from all the sensors are analyzed by the network, or can be sent to the server if needed for further analysis. This is useful in the event that public safety officers wish to conduct a search in private due to safety concerns.

In embodiments, accidents are recognized by using cognitive processing algorithms of video data from the smart vehicles data sensors, which algorithms have been taught to recognize conditions in which accidents are likely to have occurred, for example, where it is determined that two vehicles are touching one another.

An example utilizing the present invention is a situation where a distracted driver of a non-smart vehicle A fails to apply the brakes quickly enough, and rear ends non-smart vehicle B. In order to avoid blame, the driver of non-smart vehicle A alleges that vehicle B cut him off and then immediately applied the brakes, not giving the driver of vehicle A the opportunity to stop. In this example, the driver of vehicle B was disoriented after the accident, and could not recollect what happened. Meanwhile, although drivers of smart vehicles C and D did not actually see the accident as they passed by, sensors on their smart vehicles obtained data regarding the accident, particularly since smart vehicles have sensor visibility in all directions (in other words, a smart vehicle can obtain data regarding an accident even if the smart vehicle has already passed the scene of the accident, or the accident occurs after the smart vehicle has gone past the location where the accident is about to happen). In accordance with the invention, smart vehicles C and D upload pertinent sensor data to an external server, allowing the operator of the external server to determine the true cause of the accident by re-creating the accident from the uploaded sensor data.

Another example is a situation where an Amber Alert, or a Silver Alert, occurs for a red SUV with license plate XYZ (vehicle A), and smart vehicle B receives the description and license plate to look for from and external server. Although the driver of smart car B does not notice that he is passing vehicle A, cameras on vehicle B capture the license plate process the video using cognitive analysis, such as computer vision. Once smart vehicle B matches the license plate, it automatically reports the location and time of the recognition of vehicle A by vehicle B to the external server, as well as providing relevant sensor information, such as video of vehicle A.

As discussed above, in accordance with aspects of the present invention, sensor data collected by smart vehicles is leveraged for events involving non-smart vehicles, such as accidents which the non-smart vehicles are involved in. Also, collected data is processed, either locally in the smart vehicle or remotely on the server, to detect either that an event of interest has occurred, such as an accident, or that an item of interest has been identified, such as a license plate. Based on this, appropriate action is taken, such as contacting emergency responders.

In accordance with other aspects of the invention, the external server, on behalf of an authority (e.g., police) for an event, requests sensor data from smart vehicles which bypassed the accident area at the time. The server may broadcast the request to all smart vehicles in a certain area and the specific information required, such as videos from the camera, or the server may ask for generic sensor information from the smart vehicles.

In accordance with other aspects of the invention, the smart vehicle receives instructions from the external server to drive past the detected predetermined event and/or object to provide additional sensor data after it has been initially determined that the predetermined event/object has been found in sensor data. Alternatively, the external server can provide instructions to the smart vehicle to drive past an event/object which has been detected by other sensors, such as traffic cameras. In accordance with other aspects of the invention, the driver of the smart vehicle has the ability to override the instructions from the external server to drive past the detected predetermined event and/or object.

In accordance with other aspects of the invention, the authorization of the driver is obtained before providing portions of the smart vehicle sensor data pertaining to the predetermined event and/or object to the external server. On the other hand, in alternative embodiments, the external server maintains privacy regarding confidential information in situations where it is necessary to conduct a search for non-smart vehicles or objects by using the smart vehicle sensors without advising the driver that the smart vehicle sensors are being used for purposes of obtaining information regarding events and/or objects related to nearby non-smart vehicles. It is noted that in the embodiments discussed above, in accordance with aspects of the invention providing the portions of the sensor data pertaining to the predetermined event and/or object occurs in real-time. In alternative embodiments, the providing of the portions of the sensor data pertaining to the predetermined event and/or object to the external server takes place on a delayed basis, particularly in situations where authorization of the driver is obtained prior to sending the sensor data to the external server. It is noted that, in all embodiments, the gathering and use of sensor data is to be performed lawfully, e.g., in accordance with applicable laws regarding individual privacy, etc.

Advantageously, embodiments of the present invention provide technical solutions to the problem of obtaining data about events/objects which pertain to non-smart vehicles or other objects, persons or other occurrences, utilizing sensors in nearby smart vehicles. In implementations, the system performs an unconventional operation of utilizing physical vehicle sensors in a smart vehicle to provide sensor data that is utilized to analyze events which occur to nearby non-smart vehicles, or objects, including those associated with non-smart vehicles, which do not directly pertain to the smart vehicle collecting the data. Aspects of the invention are implemented using devices and techniques that are necessarily rooted in computer technology, such as computer-based cognitive analysis and classification, that have no pre-computer analog. Further, aspects of the invention are implemented with particular physical sensors, such as Lidar, ultrasonic sensors, video cameras, infrared detectors, GPS systems, instruments, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
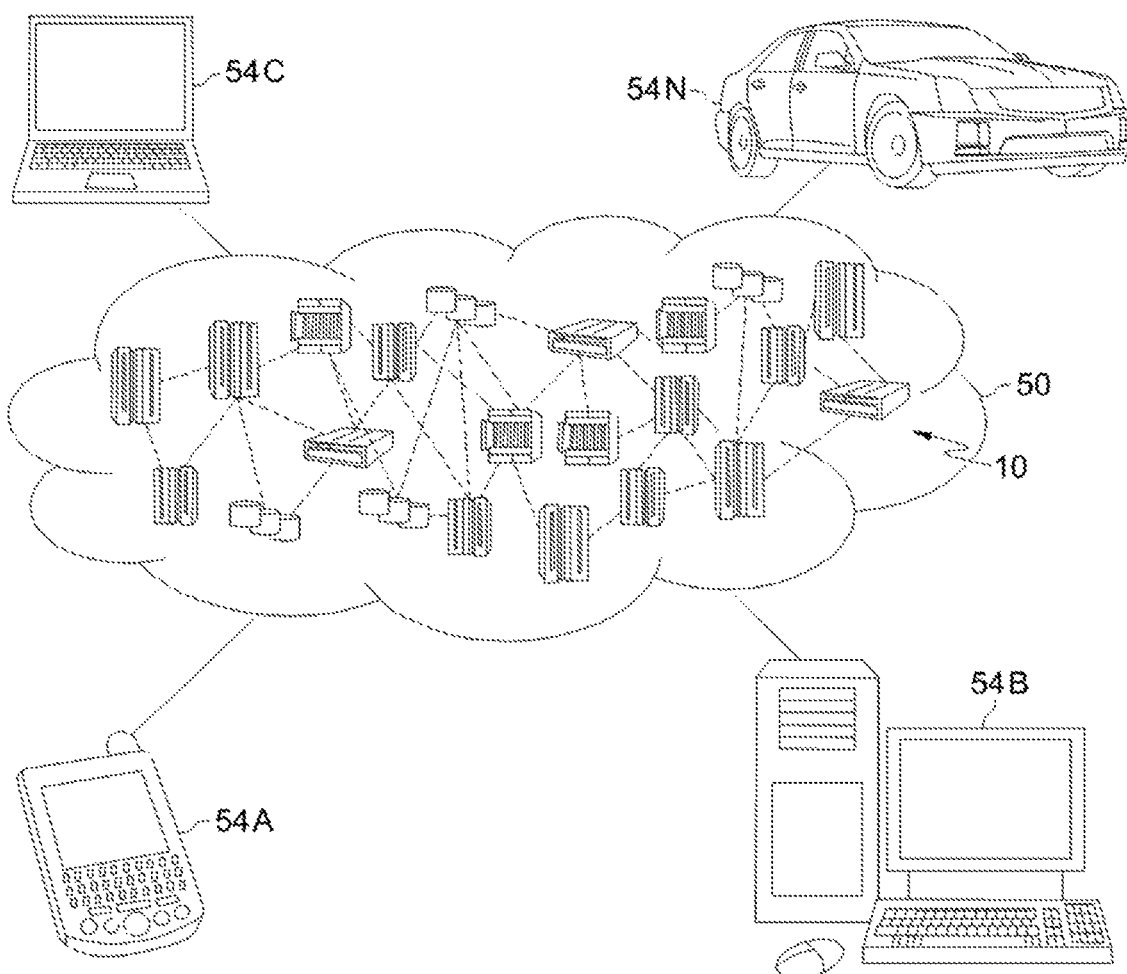
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
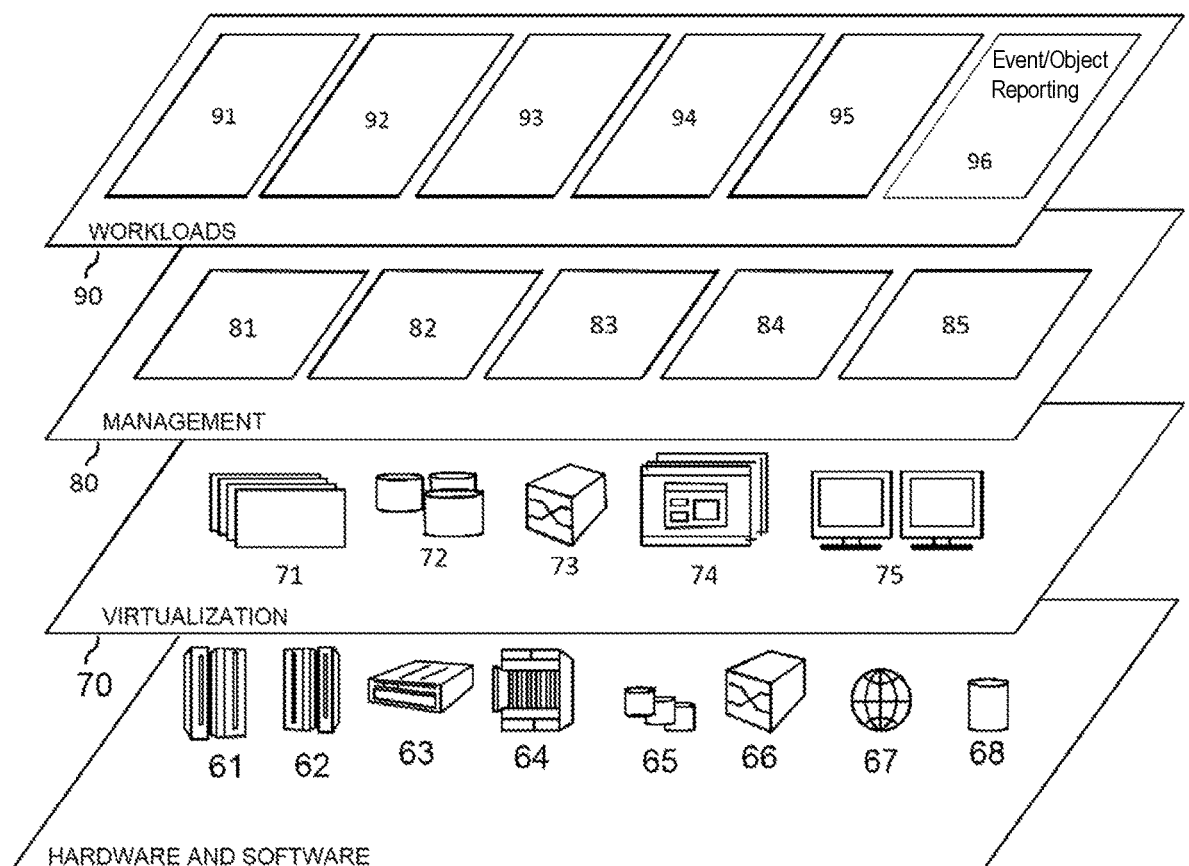
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event/object reporting 96.

Figure 4:
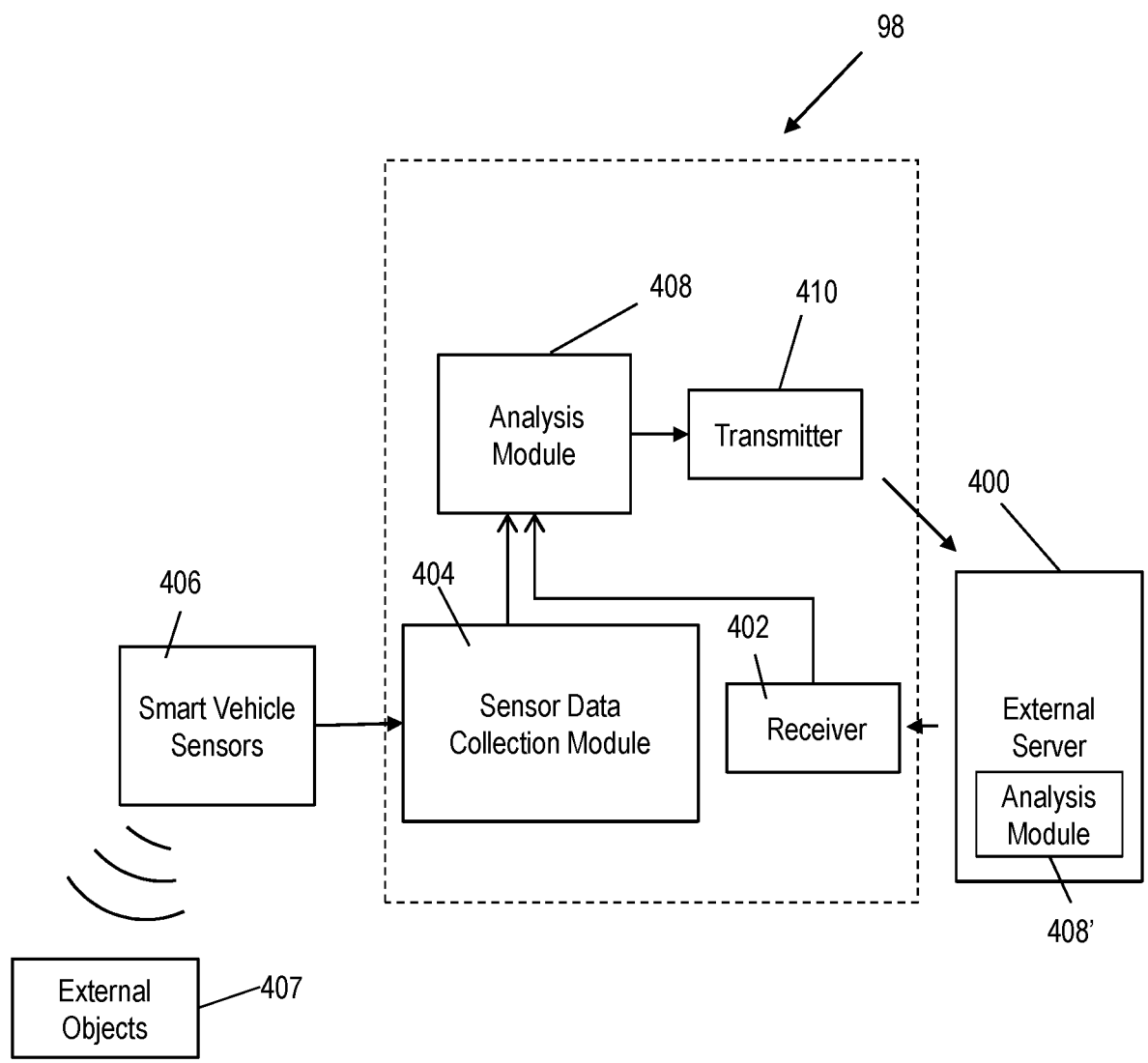
FIG. 4 shows a block diagram of an exemplary environment in accordance with aspects of the invention.

FIG. 4 shows a block diagram of an exemplary environment in accordance with aspects of the invention. In embodiments, the environment includes an event/object reporting system 98, which performs functions of the event/object reporting workload 96 of FIG. 3. In embodiments, the system 98 is located in a smart vehicle, such as the vehicle 54N in FIG. 2, and includes a receiver 402, a sensor data collection module 404, smart vehicle sensors 406 for sensing external objects 407, an analysis module 408 and a transmitter 410. In embodiments, the sensors 406 include one or more of LiDAR, ultrasonic sensors, video cameras, and infrared detectors.

In embodiments, instructions are received by the receiver 402 from the external server 400 to indicate to the analysis module 408 events and/or objects to look for in sensor data received from the smart vehicle sensors 406. The transmitter 410 transmits analyzed sensor data to the external server 400 in response to the analysis module 408 determining a match between the sensor data from the sensors 406 and the instructions of event/objects to look for from the external server 400. In alternative embodiments, all or portions of the sensor data from the smart vehicle sensors 406 is sent to the external server 400, and analysis to determine a whether a match exists between the sensor data and the event/object being looked for takes place in an alternative analysis module 408' in the external server 400. In embodiments, the portions of the sensor data pertaining to the event and/or object are provided to the external server 400 in real time.

With continued reference to FIG. 4, the event/object reporting system 98 comprises a computer system that may include one or more elements of the computer system/server 12 of FIG. 1. Aspects of the invention are not limited to the exact number of modules shown in FIG. 4, and fewer modules may be used by combining the functionality of one or more modules into another module. Conversely, more modules may be employed by splitting the functionality of one or more of the modules shown into plural different modules.

The event/object reporting system 98 shown in FIG. 4 includes a receiver 402 which receives instructions from an external server 400 regarding events (for example, accidents) or objects (e.g., license plates and car model/make and color) for which the external server 400 instructs the smart vehicle to provide data.

In embodiments, the smart vehicle sensors 406 provide sensor data either continuously or periodically to the sensor data collection module 404. The smart vehicle sensors 406 are connected to a sensor data collection module 404 which collects the sensor data either continuously or periodically. In embodiments the sensor data also includes metadata including time and location of the at least one sensor at a time of detecting the event and/or object. Regarding this, it is noted that certain types of smart vehicles provide a cadence by which to periodically collect sensor data from the smart vehicle sensors 406.

With continued reference to FIG. 4, outputs of the receiver 402 and the sensor data collection module 404 are both provided to an analysis module 408. The analysis module 408 utilizes various types of equipment and programming to compare the sensor data received from the sensor data collection module 404 with the information received from the receiver 402 regarding the events and/or objects which the external server 400 is looking for regarding non-smart vehicles (utilizing the smart vehicle sensors 406). In embodiments, the analysis module 408 utilizes cognitive processing to analyze the sensor data received from the sensor data collection module 404 and to compare it to the instructions which the external server 400 has provided to the receiver 402 (which, in turn, passes these instructions to the analysis module 408) to determine whether a match exists regarding the events or objects being looked for and the events or objects actually sensed by the smart vehicle sensors 406.

In alternative embodiments, the sensor data obtained by the smart vehicle sensors 406 is supplemented with supplemental data obtained from other sensors in the area, such as traffic cameras. In these alternative embodiments, the supplemental data is provided to the external server 400 to be utilized in further analysis of the event/object in the external server 400. In accordance with other aspects of the invention, the supplemental data is provided to the receiver 402 to provide to the analysis module 408 to assist in cognitive processing performed in the analysis module 408 to determine whether a match exists between the sensed data from the smart vehicle sensors 406 and the supplemental data from other sources, such as traffic cameras, and the instructions from the receiver 402 regarding what types of events/objects to look for. Alternatively, all of the sensor data from the smart vehicle sensors 406 and the supplemental data from sources such as traffic cameras can be provided directly to the external server 400 for analysis and a determination as to whether the events/objects which the external server 400 is looking for are actually found in any of the sensed data. In this case, the analysis of the sensor data and the supplemental data is performed using cognitive processing in the external server 400.

In embodiments, the transmitter 410 is configured to receive an output from the analysis module 408 in response to the analysis module 408 detecting a match between the sensor data which the analysis module 408 received from the sensor data collection module 404 and the instructions which the analysis module 408 received from the receiver 402. When a match is detected, the transmitter 410 transmits the matching data to the external server 400. In other words, the transmitter 410 transmits all pertinent sensor data which pertains to the events and/or objects which the external server 400 has indicated an interest in via the instructions provided to the receiver 402 as to what types of events/objects the external server is looking for. In alternative embodiments, the transmitter transmits not only all pertinent sensor data pertaining directly to the events and/or objects which the external server has indicated as of interest, but also sensor data with regard to predetermined time periods before and/or after the time during which the event and/or object has been detected by the smart vehicle sensors 406.

In some embodiments, either the analysis module 408 in the smart vehicle or the analysis module 408' in the external server 400 advises the driver of the smart vehicle that the event and/or object has been found in the sensor data, and requests authorization from the driver to provide portions of the sensor data pertaining to the event and/or object to the external server 400. When the analysis module 408, or the analysis module 408', receives this authorization from the driver, the portions of the sensor data pertaining to the event and/or object are provided to the external server 400 via the transmitter 410 based upon the received authorization.

In some embodiments, in response to receiving an indication of a match from the transmitter 410, the external server 400 provides an instruction to the driver of the smart vehicle to request that the driver of the smart vehicle to drive past the event and/or object to collect and provide additional sensor data based on the detecting. In this embodiment, the driver of the smart vehicle has the ability to override the instructions from the external server 400 by providing an instruction to the analysis module 408 to override the instruction from the external server 400.

In embodiments, the event/object reporting system 98 can comprise, or be part of, a cloud computing environment, such as cloud computing environment 50 of FIG. 2. In this embodiment, each of the elements, such as the sensor data collection module 404 and the analysis module 408, comprises a respective cloud computing node such as cloud computing nodes 10 of FIG. 2, coupled for communication through the cloud network 150. On the other hand, in alternative embodiments, these elements are implemented in the smart vehicle itself, as discussed above.

Figure 5:
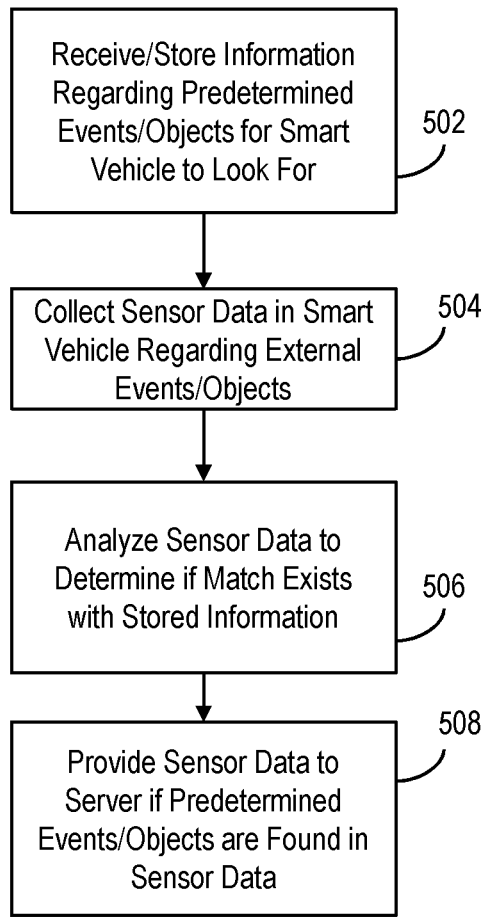
FIG. 5 shows a flowchart of an exemplary method in accordance with aspects of the invention.

FIG. 5 depicts a flowchart of an exemplary method in accordance with aspects of the invention. The steps of the method may be performed in the environment of FIG. 4 and are described with reference to the elements and steps described with respect to FIGS. 2 and 3.

At step 502 of FIG. 5, the receiver 402 in the event/object reporting system 98 in a smart vehicle stores information regarding predetermined event/objects pertaining to non-smart vehicles or other objects to look for, as discussed above with regard to FIG. 4. In embodiments, this stored information is based on instructions received from the external server 400 pertaining to an event which the external server 400 has determined has already occurred, and additional information is being sought from the smart vehicle regarding this event. In alternative embodiments, the stored information is based on instructions from the external server regarding an object which the external server 400 is trying to locate. In further alternative embodiments, the stored information pertains to events, such as accidents, natural disasters, fires etc. which have not yet occurred, but which the smart vehicle is preprogrammed to look for and report to the external server 400 when the smart vehicle sensors 406 receive data that such an event has occurred. For example, in accordance with this alternative embodiment, the analysis module 408 is preprogrammed to store information indicating that an accident is occurred, e.g., that two vehicles are touching one another, or two vehicles came into contact with one another with a closing rate of speed before contact exceeding a predetermined limit.

In step 504, the sensor data is collected in the smart vehicle, using the sensor data collection module 404 operating to collect data received by the smart vehicle sensors 406, as discussed above with regard to FIG. 4. In step 506, the analysis module 408 analyzes the smart vehicle sensor data received from the smart vehicle sensors 406. More specifically, in embodiments, the output data from the sensor data collection module 404 and the stored information, or instructions as to what to look for from the receiver 402, are both provided to the analysis module 408. In embodiments, the analysis is performed using cognitive processing, and, based upon this analysis, determines whether the smart vehicle has detected event/objects corresponding to the event/objects from the stored information, or for which the external server 400 has provided instructions to the smart vehicle to look for. In this case, it is determined that a match exists between the sensor data and the stored information or the instructions from the external server 400 as to what the smart vehicle should be looking for.

In step 508 when a match is determined by the analysis module 408 between the stored information or the instructions regarding events/objects to look for from the external server 400 and the sensor data from the smart vehicle sensors 406 and the sensor data collection module 404, the analysis module 408 sends an indication of this match, and the corresponding data, to the transmitter 410 which, in turn, transmits all of the sensor data pertaining to the sensed events/object (which matches the instructions) to the external server 400.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   collecting, by the computer device, sensor data from at least one sensor on a smart vehicle regarding events/objects external to the smart vehicle;
   analyzing, by the computer device, the sensor data to detect whether a predetermined event and/or object external to the smart vehicle is found in the sensor data;
   transmitting, by the computer device, portions of the sensor data pertaining to the predetermined event and/or object to an external server based on the detecting;
   advising the driver of the smart vehicle that the predetermined event and/or object has been found in the sensor data;
   requesting authorization from the driver to provide portions of the sensor data pertaining to the predetermined event and/or object to the external server;
   receiving authorization from the driver to provide the portions of the sensor data pertaining to the predetermined event and/or object to the external server; and
   providing the portions of the sensor data pertaining to the predetermined event and/or object to the external server based upon the received authorization.

2. The computer implemented method of claim 1, wherein the predetermined event and/or object includes an accident involving a vehicle other than the smart vehicle.

3. The computer implemented method of claim 1, wherein the predetermined event and/or object includes at least one selected from the group consisting of: a license plate number; and a vehicle description of a vehicle other than the smart vehicle.

4. The computer implemented method of claim 1, wherein the at least one sensor includes at least one selected from the group consisting of: LiDAR, ultrasonic sensors, video cameras, and infrared detectors.

5. The computer implemented method of claim 4, wherein the sensor data includes metadata including time and location of the at least one sensor at a time of detecting the event and/or object.

6. The computer implemented method of claim 1, further comprising receiving, by the computing device and from the external server, an instruction for the smart vehicle to drive past the predetermined event and/or object to collect and provide additional sensor data based on the detecting.

7. The computer implemented method of claim 6, further comprising receiving input from a driver of the smart vehicle to override the instruction from the external server for the smart vehicle to drive past the predetermined event and/or object to collect and provide additional sensor data based on the detecting.

8. The computer implemented method of claim 7, further comprising providing the portions of the sensor data pertaining to the predetermined event and/or object to the external server in real time.

9. A computer program product, the computer program product comprising a computer readable storage medium having program instructions embodied therewith, the program instructions executable by a computing device external to a smart vehicle to cause the computing device to:
   transmit an instruction to the smart vehicle to look for an event and/or object pertaining to vehicles or objects other than the smart vehicle;
   receive, from the smart vehicle, sensor data obtained by at least one sensor on the smart vehicle in response to the instructions to look for the event and/or object;
   analyze the sensor data received from the smart vehicle to detect whether the event and/or object is found in the sensor data;
   receive from the external server, an instruction for the smart vehicle to drive past the predetermined event and/or object to collect and provide additional sensor data based on the detecting; and
   receive input from a driver of the smart vehicle to override the instruction from the external server for the smart vehicle to drive past the predetermined event and/or object to collect and provide additional sensor data based on the detecting.

10. The computer program product of claim 9, wherein the event and/or object includes an accident involving a vehicle other than the smart vehicle.

11. The computer program product of claim 9, wherein the event and/or object includes at least one selected from the group consisting of: a license plate number; and a vehicle description of a vehicle other than the smart vehicle.

12. The computer program product of claim 9, wherein the at least one sensor include at least one selected from the group consisting of: LiDAR, ultrasonic sensors, video cameras, and infrared detectors.

13. The computer program product of claim 9, wherein the sensor data includes metadata including time and location of the sensors at a time of detecting the event and/or object.

14. The computer program product of claim 9, further comprising transmitting an instruction to the smart vehicle to drive past the detected event and/or object to provide additional sensor data based on the determination that the event and/or object is found in the sensor data.

15. A system comprising:
- a processor, a computer readable memory, and a computer readable storage medium located in a smart vehicle;
- program instructions to receive, in the smart vehicle, instructions from an external server to look for an event and/or object external to the smart vehicle;
- program instructions to collect sensor data from at least one sensor on the smart vehicle;
- program instructions to analyze the sensor data to detect the event and/or object in the sensor data;
- program instructions to provide portions of the sensor data pertaining to the event and/or object to the external server based on the detecting;
- program instructions to advise the driver of the smart vehicle that the predetermined event and/or object has been found in the sensor data;
- program instructions to request authorization from the driver to provide portions of the sensor data pertaining to the predetermined event and/or object to the external server;
- program instructions to receive authorization from the driver to provide the portions of the sensor data pertaining to the predetermined event and/or object to the external server; and
- program instructions to provide the portions of the sensor data pertaining to the predetermined event and/or object to the external server based upon the received authorization, wherein the program instructions are stored on the computer readable storage medium for execution by the processor via the computer readable memory.

16. The system of claim 15, wherein the event and/or object includes an accident involving a vehicle other than the smart vehicle.

17. The system of claim 15, wherein the event and/or object includes at least one selected from the group consisting of: a license plate number; and a vehicle description of a vehicle other than the smart vehicle.

18. The system of claim 15, wherein the at least one sensor includes at least one selected from the group consisting of: LiDAR, ultrasonic sensors, video cameras, and infrared detectors.

19. The system of claim 15, wherein the sensor data includes metadata including time and location of the at least one sensor at the time of detecting the event and/or object.

20. The computer implemented method of claim 15, further comprising:
- program instructions to receive, by the computing device and from the external server, an instruction for the smart vehicle to drive past the predetermined event and/or object to collect and provide additional sensor data based on the detecting; and
- program instructions to receive an input from a driver of the smart vehicle to override the instruction from the external server for the smart vehicle to drive past the predetermined event and/or object to collect and provide additional sensor data based on the detecting.

* * * * *